United States Patent [19]
Koike

[11] Patent Number: 5,231,519
[45] Date of Patent: Jul. 27, 1993

[54] IMAGE PROCESSOR WHICH CONVERTS IMAGE WITH POOR RESOLUTION INTO IMAGE WITH IMPROVED RESOLUTION

[75] Inventor: Kazumasa Koike, Atsugi, Japan
[73] Assignee: Ricoh Company, Ltd., Tokyo, Japan
[21] Appl. No.: 775,537
[22] Filed: Oct. 15, 1991
[30] Foreign Application Priority Data
  Nov. 20, 1990 [JP] Japan .................................. 2-312829
[51] Int. Cl.$^5$ .............................................. H04N 1/40
[52] U.S. Cl. .................................. 358/456; 358/166; 358/445
[58] Field of Search ............... 358/426, 429, 445, 456, 358/457, 138, 140, 166; 382/22, 27

[56] References Cited
U.S. PATENT DOCUMENTS

| | | | |
|---|---|---|---|
| 4,437,122 | 3/1984 | Walsh et al. | 358/166 |
| 4,506,382 | 3/1985 | Hada et al. | 358/166 |
| 4,652,934 | 3/1987 | Muroya et al. | 358/426 |
| 4,782,399 | 11/1988 | Sato | 358/456 |

Primary Examiner—Edward L. Coles, Sr.
Assistant Examiner—Kim Yen Vu
Attorney, Agent, or Firm—Oblon, Spivak, McClelland, Maier & Neustadt

[57] ABSTRACT

An image processor converts a resolution of an image from an inferior resolution to a superior resolution and performs an smoothing process for smoothing jagged edges of an image by using a 3*3 pixel matrix. The center of the 3*3 pixel matrix is a target pixel which is to be converted from the inferior resolution to the superior resolution. The image processor according to the present invention may use a first row of the 3*3 pixel matrix which has been converted into the superior resolution, so that the target pixel can be converted more accurately. In addition, the image processor may use four color patterns of the 3*3 pixel matrix so that the jagged edge of the image can be smoothed in a horizontal direction. Moreover, the image processor may use different color patterns of the 3*3 pixel matrix when the image processor converts the resolution of the image from the inferior resolution to an intermediate resolution and then converts the resolution of the image from the intermediate resolution to the superior resolution, so that errors caused by the conversion never accumulate.

5 Claims, 14 Drawing Sheets

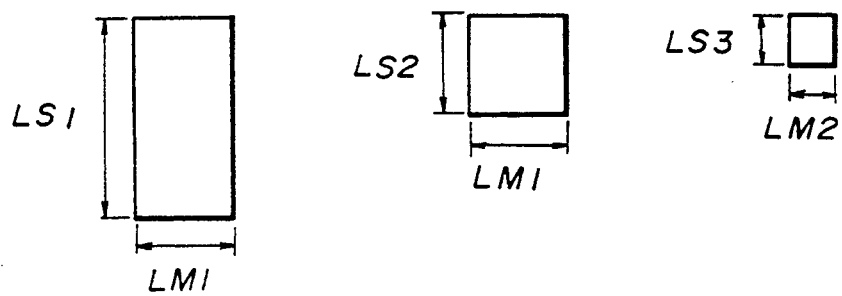
FIG.IA PRIOR ART   FIG.IB PRIOR ART   FIG.IC PRIOR ART
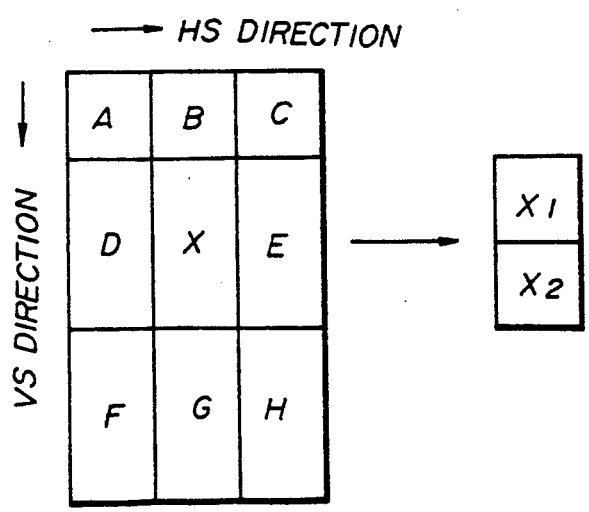
FIG.2

NON IMAGE PART
IMAGE PART
UNCERTAIN PART 5,231,519

IMAGE PROCESSOR WHICH CONVERTS IMAGE WITH POOR RESOLUTION INTO IMAGE WITH IMPROVED RESOLUTION

BACKGROUND OF THE INVENTION

The present invention relates generally to an image processor which converts an image with poor resolution into an image with improved resolution.

A conventional group 3 (G3) facsimile apparatus (FAX) adopts to standard resolution, high level resolution and/or fine resolution, the high level resolution having twice as high resolution power in a vertical scanning (abbreviated VS hereinafter) direction as the standard resolution, and the fine resolution having twice as high resolution power in respective horizontal scanning (abbreviated HS hereinafter) and VS directions as the high level resolution. Each picture element (pixel) of the standard resolution has area shown in FIG. 1A of LM1 of ⅛ mm in the HS direction multiplied by LS1 of 1/3.58 mm in the VS direction. Each pixel of the high level resolution has area shown in FIG. 1B of LM1 of ⅛ mm in the HS direction multiplied by of 1/7.7 mm in the VS direction. In addition, each pixel of the fine resolution has area shown in FIG. 1C of LM2 of 1/16 mm in the HS direction multiplied by LS3 of 1/15.4 mm in the VS direction. The degree to which image quality, inversely proportional to the area of a pixel, is improved by these resolutions ascends in this order; the fine resolution, high level resolution, standard resolution.

In the conventional communication system in which a receiver FAX uses a resolution superior to a transmitter FAX the receiver FAX uses, for example, the high level resolution and the transmitter FAX uses the standard resolution, the receiver FAX converting a resolution of image data transmitted from the transmitting FAX into its higher resolution (high level resolution) before the receiver FAX stores the image data in its memory or plots out.

However, the above conventional system has a disadvantage in that the receiver FAX cannot perform an effective smoothing process for smoothing jagged edges of an image and thus the image quality is degraded.

SUMMARY OF THE INVENTION

Accordingly, it is a general object of the present invention to provide a novel and useful image processor which converts an image with poor resolution into an image with improved resolution in which the above disadvantage is eliminated.

Another and more specific object of the present invention is to provide an image processor which converts an image with poor resolution into an image with improved resolution in which an effective smoothing process can be performed.

According to one feature of the present invention, an image processor which converts a first resolution with which a predetermined image is expressed on a first pixel matrix into a second resolution with which the predetermined image is expressed on a second pixel matrix, the first pixel matrix comprising a plurality of first pixels each of which is predetermined integer times as long as each of second pixels in a horizontal scanning direction and/or in a vertical scanning direction, which second pixels constitute the second pixel matrix, comprises dividing means for dividing each first pixel into the predetermined integer number of second pixels, and color set means for setting a color of an arbitrary second pixel based on a color pattern of a 3*3 pixel matrix whose first, second and third rows are respectively aligned with the horizontal direction and whose first, second and third columns are respectively aligned with the vertical direction, the first row of the 3*3 pixel matrix comprising three second pixels, and the second and third rows of the 3*3 pixel matrix comprising six first pixels, a center pixel of the 3*3 pixel matrix being a target pixel X including the arbitrary second pixel.

According to another feature of the present invention, an image processor which converts a standard resolution with which a predetermined image is expressed on a first pixel matrix into a high level resolution with which the predetermined image is expressed on a second pixel matrix, the first pixel matrix comprising a plurality of first pixels each of which is as long as each of second pixels in a horizontal scanning direction but twice as long as the same in a vertical scanning direction, which second pixels constitute the second pixel matrix, comprises dividing means for dividing each first pixel into two second pixels, and color set means for setting a color of each of two second pixels X1 and X2 based on a color pattern of a 3*3 pixel matrix whose first, second and third rows are respectively aligned with the horizontal scanning direction and whose first, second and third columns are respectively aligned with the vertical scanning direction, the 3*3 pixel matrix comprising nine first pixels, a center pixel of the 3*3 pixel matrix being a target pixel X which comprises the pixels X1 and X2, the pixels of the first row from the first column to the third column of the 3*3 pixel matrix being referred to as A, B and C, the pixels of the second row from the first column to the third column thereof being referred to as D, X and E, the pixels of third row from the first column to the third column thereof being referred to as F, G and H, the color set means setting the pixel X1 white and the pixel X2 black if the pixels A, B, C and D are white and the pixels X, E and F are black, or if pixels A, X and E are white and the pixels D, G and H are black, and the color set means setting the pixel X1 black and the pixel X2 white if the pixels B, C and D are black and the pixels X, E and F are white, or if pixels A, X and E are black and the pixels D, F, G and H are white.

According to still another feature of the present invention, an image processor which converts a standard resolution with which a predetermined image is expressed on a first pixel matrix into a fine resolution with which the predetermined image is expressed on a second pixel matrix, the first pixel matrix comprising a plurality of first pixels each of which is twice as long as each of second pixels in a horizontal scanning direction and four times as long as each of the second pixels in a vertical scanning direction, the second pixels constituting the second pixel matrix, comprises first converting means for converting the standard resolution into a high level resolution with which the predetermined image is expressed on a third pixel matrix which comprises a plurality of third pixels, each of the first pixels being as long as each of the third pixels in the horizontal scanning direction but twice as long as each of the third pixels in the vertical scanning direction, which first converting means comprises first dividing means for dividing each first pixel into two third pixels, and first color set means for setting a color of two third pixels X1 and X2 based on a first color pattern of a first 3*3 pixel matrix whose first, second and third rows are respectively aligned with the horizontal scanning direction and whose first, second and third columns are respectively aligned with the vertical scanning direction, the first 3*3 pixel matrix comprising nine first pixels, a center pixel of the first 3*3 pixel matrix being a target pixel X which comprises the third pixels X1 and X2, and second converting means for converting the high level resolution into the fine resolution, which second converting means comprises first dividing means for dividing each third pixel into four second pixel, and second color set means for setting a color of four third pixels Y00, Y01, Y10 and Y11 based on a second color pattern different from the first color pattern of a second 3*3 pixel matrix whose first, second and third rows are respectively aligned with the horizontal scanning direction and whose first, second and third columns are respectively aligned with the vertical scanning direction, the second 3*3 pixel matrix comprising ninth third pixels, a center pixel of the second 3*3 pixel matrix being a target pixel Y which comprises the pixels Y00, Y01, Y10 and Y11, the pixels Y00 and Y01 and the pixels Y10 and Y11 being aligned with the horizontal scanning direction, and the pixels Y00 and Y10 and the pixels Y01 and Y11 being aligned with the vertical scanning direction.

According to one aspect of the present invention, since the color set means uses the 3*3 pixel matrix in which the first row comprises three second pixels, the color of each pixels X1 and X2 can be more accurately set. According to another aspect of the present invention, because of the four color patterns are prepared, the jaggy edges of the first pixels are smoothed in the horizontal scanning direction. According to still another aspect of the present invention, since the first color pattern is different from the second color pattern, an error caused by the conversion is not accumulated.

Other objects and further features of the present invention will become apparent from the detailed description when read in conjunction with the accompanying drawings.

BRIEF DESCRIPTION OF THE DRAWING

FIG. 1A shows a pixel used for a standard resolution;

FIG. 1B shows a pixel used for a high level resolution;

FIG. 1C shows a pixel used for a fine resolution;

FIG. 2 shows a pixel matrix used for a first embodiment according to the present invention;

DETAILED DESCRIPTION OF THE PREFERRED EMBODIMENTS

Figure 3A:
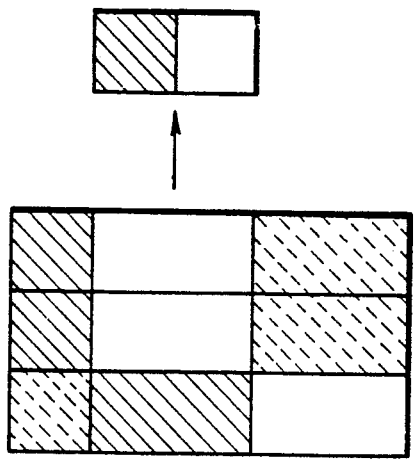
FIGS. 3A to 3D respectively show color patterns of the pixel matrix shown in FIG. 2.
Figure 3B:
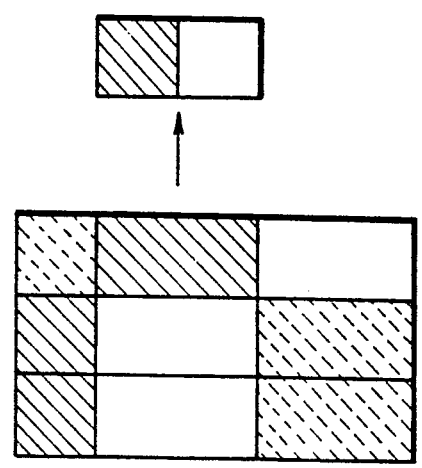
Figure 3C:
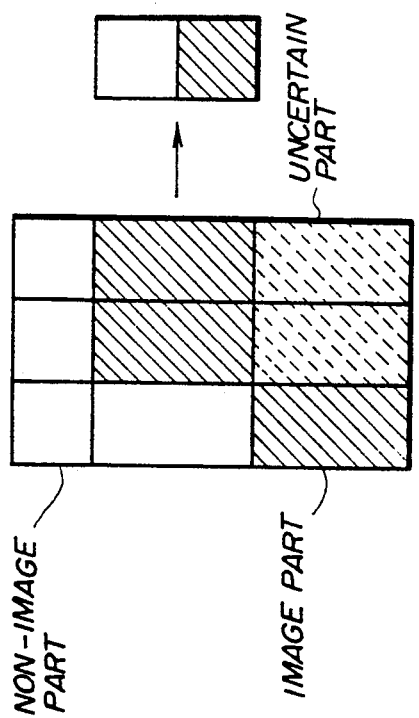
Figure 3D:
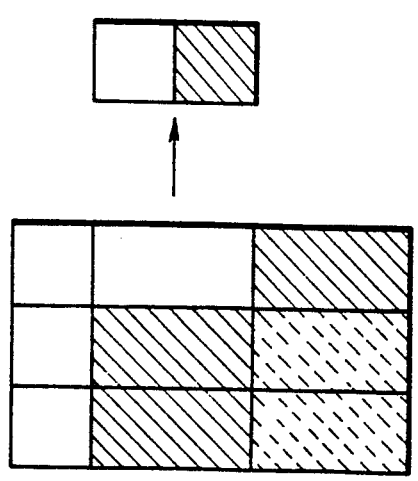
Figure 4A:
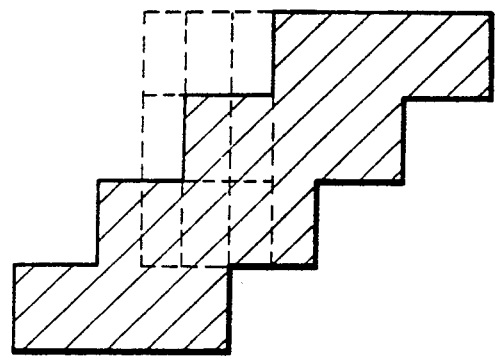
FIGS. 4A to 4C show how jagged edges of an image are smoothed based on the color patterns shown in FIG. 3A to 3D.
Figure 4B:
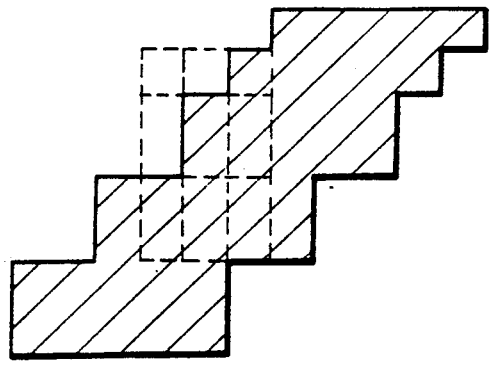
Figure 4C:
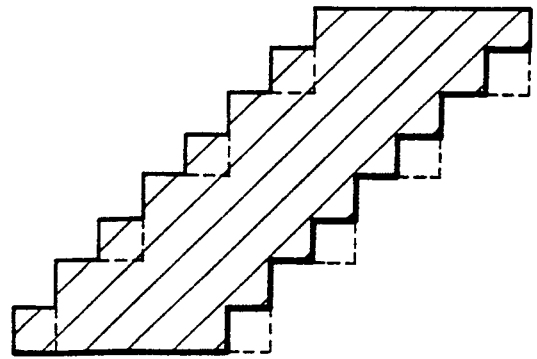
Figure 5A:
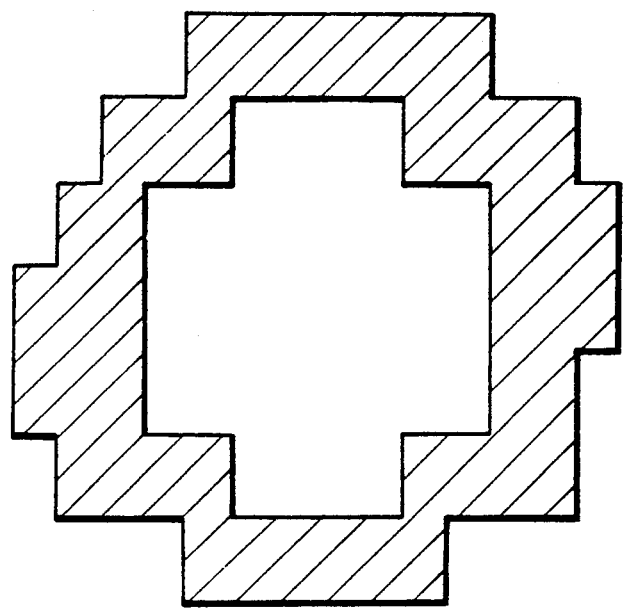
FIGS. 5A and 5B show how jagged edges of an image are smoothed based on the color patterns shown in FIG. 3A to 3D.
Figure 5B:
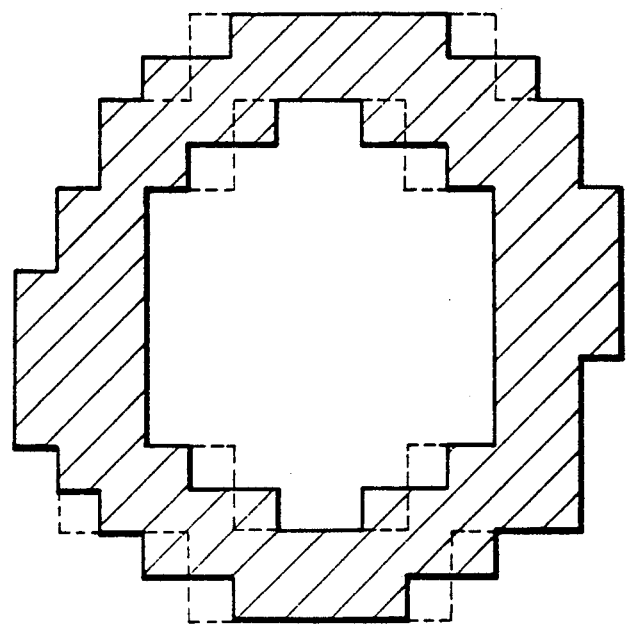

A description will now be given of a method of a first embodiment according to the present invention, with reference to FIGS. 2 and 3. In this embodiment, a target pixel X of the standard resolution is converted into pixels X1 and X2 of the high level resolution, as shown in FIGS. 3A to 3D. The present invention uses prior pixels A to C which have been converted into pixels of the high level resolution, adjacent pixels D and E, and subsequent pixels F to H, the pixels from D to H being in accordance with the standard resolution. In FIGS. 4A to 4D, the term "uncertain part" may refer to either an image part or a non-image part. If a color pattern of the pixel matrix does not correspond to any of pixel matrices shown in FIGS. 3A to 3D, the pixels X1 and X2 are determined to be colored the same as the pixel X, so that, if the pixel X is black, pixels X1 and X2 are respectively black. By using this method, an image of the standard resolution shown in FIG. 4A is first converted as shown in FIG. 4B and finally converted as shown in FIG. 4C in which jaggy edges are successfully smoothed. In addition, a circular image shown in FIG. 5A is articulated as shown in FIG. 5B.

Figure 6:
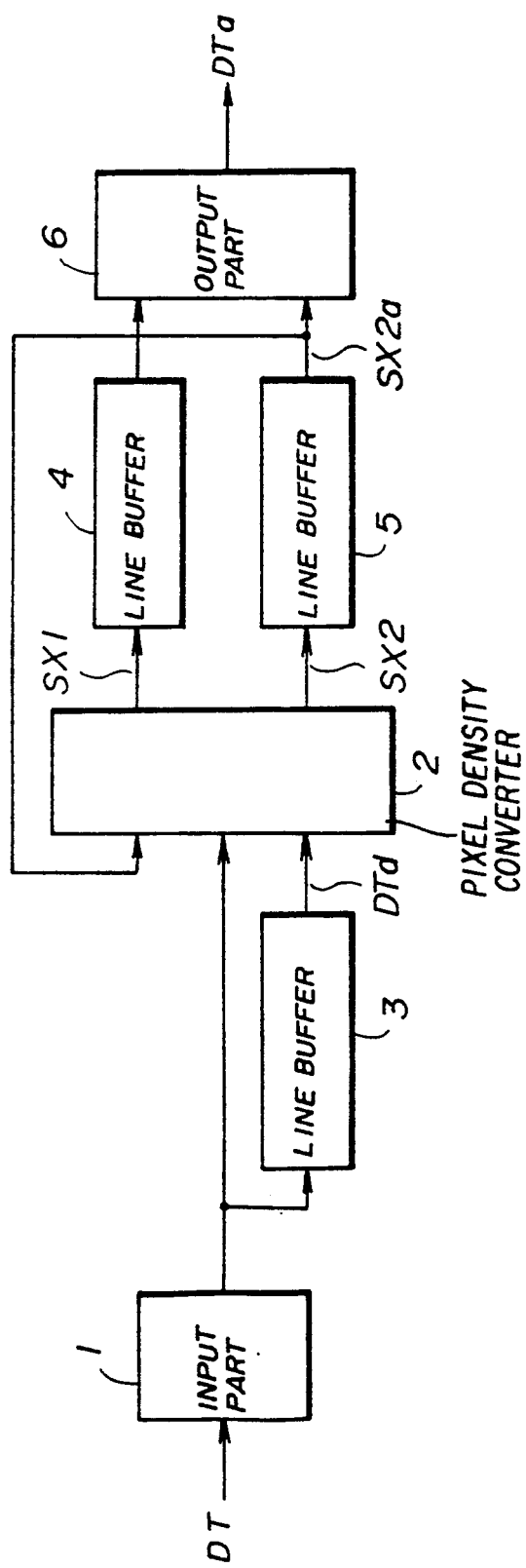
FIG. 6 shows a block diagram of an image processor of the first embodiment according to the present invention.

An image processor of a first embodiment according to the present invention which converts a target pixel X in accordance with the color patterns shown in FIGS. 3A to 3D comprises, as shown in FIG. 6, an input part 1, a pixel density converter 2, line buffers 3 to 5, and an output part 6. An image signal DT of the standard resolution is input to a next line input terminal of the pixel density converter 2 and an input terminal of the FIFO line buffer 3, respectively. The line buffer 3 outputs an image signal DTd to a target pixel line input terminal of the pixel density converter 2.

The pixel density converter 2 outputs an image signal SX1 representing the pixel X1 to the FIFO line buffer 4 and outputs an image signal SX2 representing the pixel X2 to the FIFO line buffer 5 The line buffer 4 outputs an image signal SX1a to the output part 6, and the line buffer 4 outputs an image signal SX2a to the output part 6 and a previous line input terminal of the pixel density converter 2. The pixel density converter 2 generates the image signals SX1 and SX2 based on the image signals DTd, DT, and SX2a in accordance with the color patterns shown in FIGS. 3A to 3D. The output part 6 outputs an image signal DTa, in which the pixel X is converted into the pixels X1 and X2, to a subsequent device. Incidentally, the respective buffers 4 and 5 initially store image signals representing complete white lines and thus the pixel density converter 2 starts to convert the standard resolution of the image when the image signal DT for a first 1 line is stored in the line buffer 3.

Figure 7:
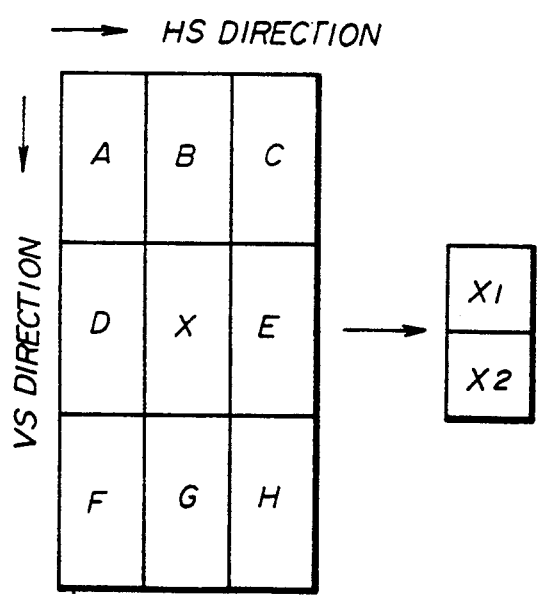
FIG. 7 shows a pixel matrix used for a second embodiment according to the present invention.
Figure 8A:
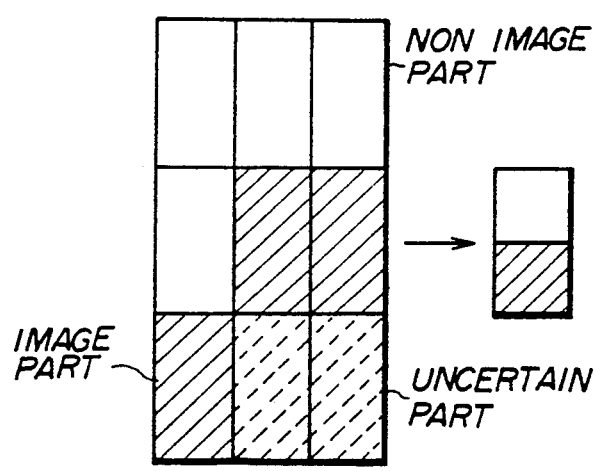
FIGS. 8A to 8D respectively show color patterns of the pixel matrix shown in FIG. 7.
Figure 8B:
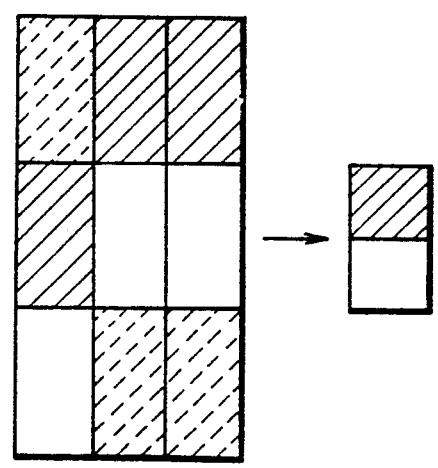
Figure 8C:
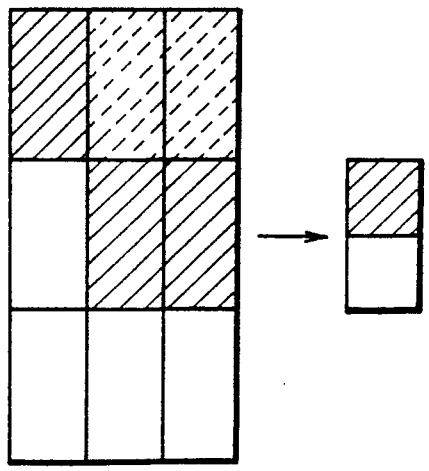
Figure 8D:
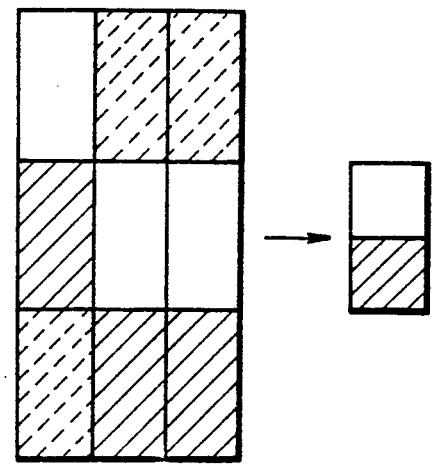
Figure 9A:
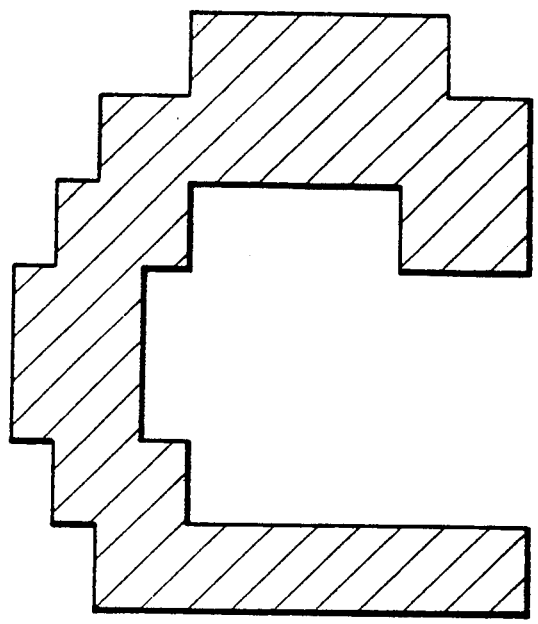
FIGS. 9A and 9B show how jagged edges of an image are smoothed based on the color patterns shown in FIG. 8A to 8D.
Figure 9B:
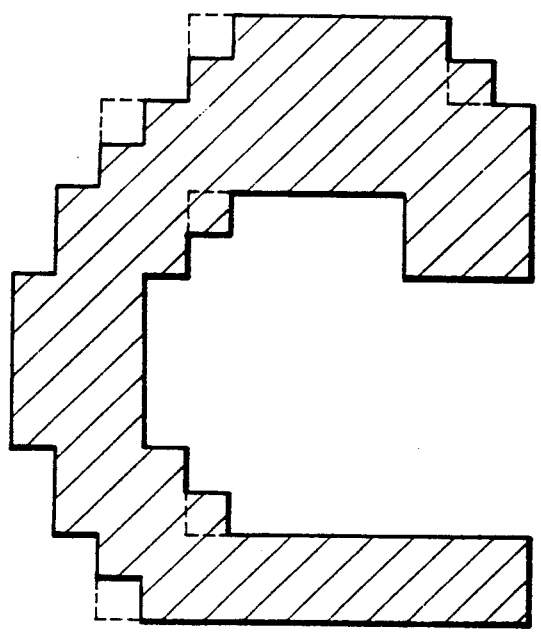

A description will now be given of an image process of a second embodiment according to the present invention with reference to FIGS. 7 and 8. In this embodiment, a target pixel X of the standard resolution is converted into pixels X1 and X2 of the high level resolution, as shown in FIG. 7. The present invention uses adjacent pixels A to H of the standard resolution in accordance with the color patterns shown in FIGS. 8A to 8D. By using this method, a C-shaped image with the standard resolution shown in FIG. 9A is converted as shown in FIG. 9B so that its jagged edges are successfully smoothed in the horizontal scanning direction.

Figure 10:
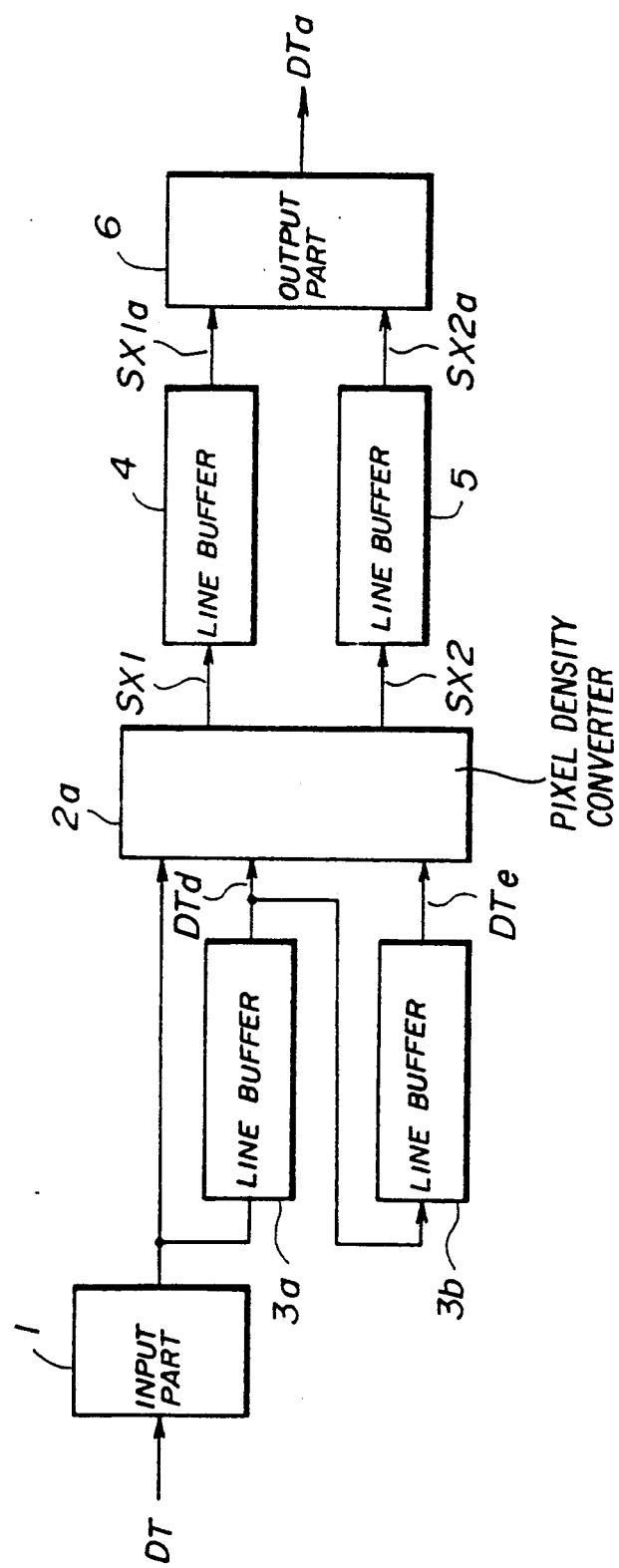
FIG. 10 shows a block diagram of an image processor of the second embodiment according to the present invention.

An image processor of the second embodiment according to the present invention which converts a target pixel X in accordance with the color patterns shown in FIGS. 8A to 8D comprises, as shown in FIG. 10, the input part 1, a pixel density converter 2a, line buffers 3a, 3b, 4 and 5 and the output part 6. Those elements in FIG. 11 which are the same as corresponding elements in FIG. 7 are designated by the same reference numerals, and a description thereof will be omitted. An image signal DT of the standard resolution is input to a next line input terminal of the pixel density converter 2a and an input terminal of the FIFO line buffer 3a, respectively. The line buffer 3a outputs an image signal DTd to a target pixel line input terminal of the pixel density converter 2a and an input terminal of the FIFO line buffer 3b. The line buffer 3b outputs an image signal DTe to a previous line input terminal of the pixel density converter 2a.

The pixel density converter 2b generates the image signals SX1 and SX2, and outputs the image signal SX1 to the FIFO line buffer 4 and outputs the image signal SX2 to the FIFO line buffer 5. The line buffer 4 outputs an image signal SX1a to the output part 6, and the line buffer 5 outputs an image signal SX2a to the output part 6. The output part 6 outputs the image signal DTa to another device in the subsequent stage. The pixel density converter 2 starts to convert the standard resolution of the image when the image signal DT for a first line is stored in the line buffer 3.

Figure 11:
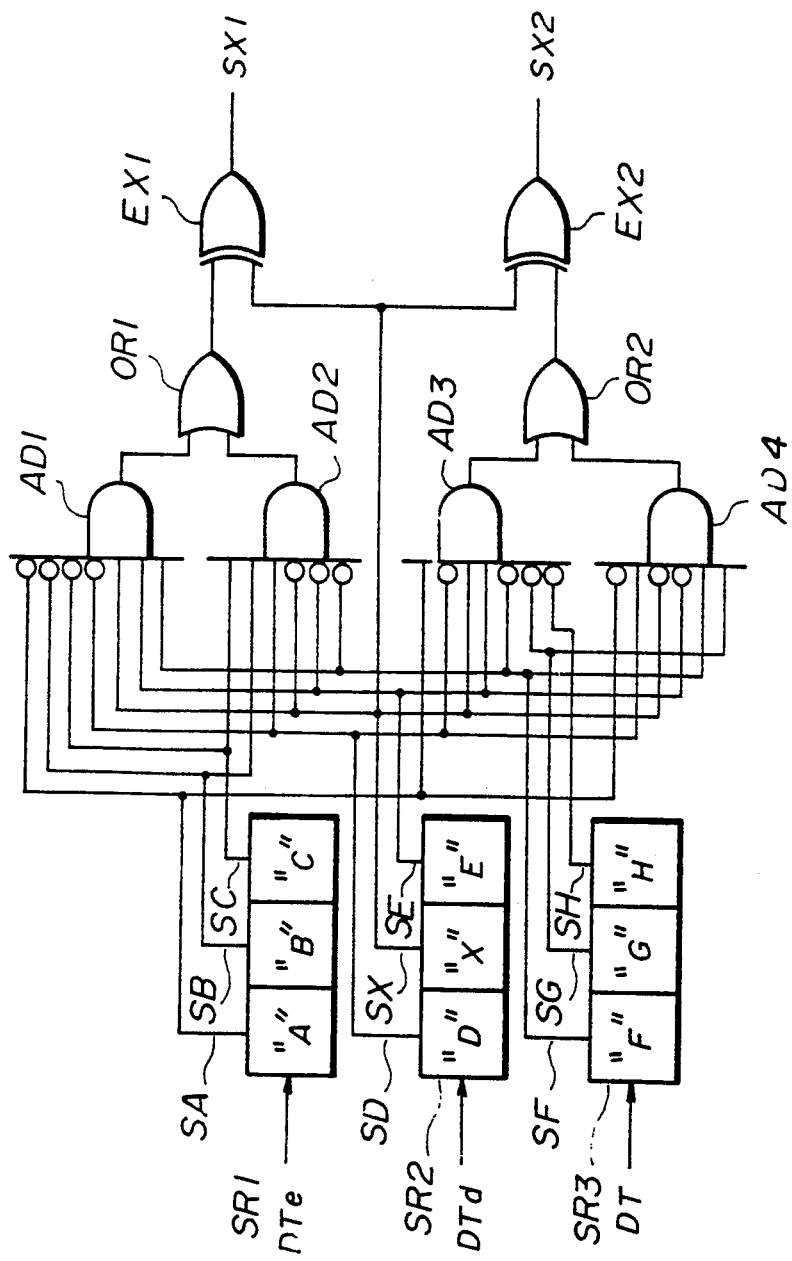
FIG. 11 shows a circuit diagram of a pixel density converter shown in FIG. 10.
Figure 12A:
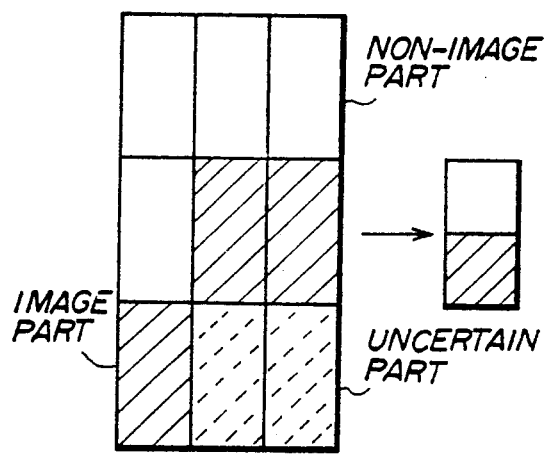
FIGS. 12A to 12D respectively show color patterns of a pixel matrix used for a third embodiment according to the present invention.
Figure 12B:
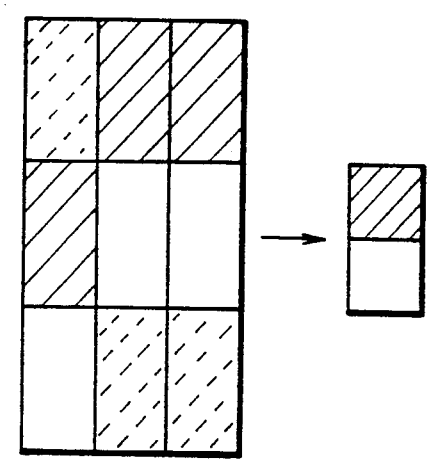
Figure 12C:
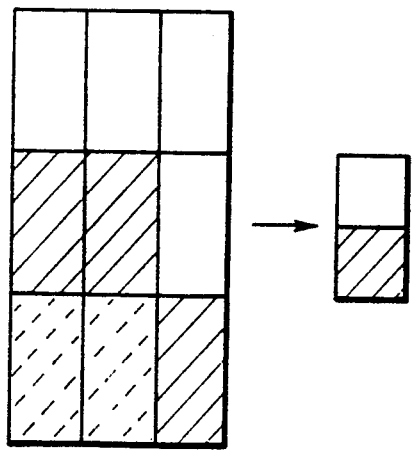
Figure 12D:
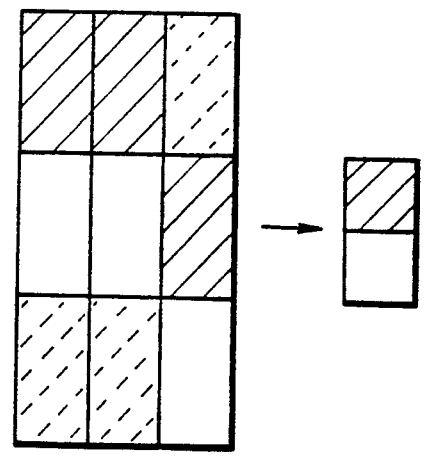
Figure 14A:
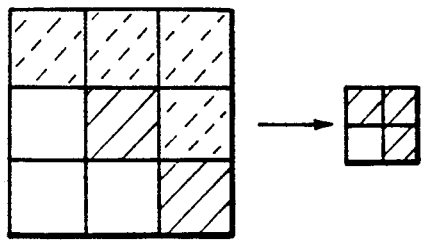
FIGS. 14A to 14H respectively show color patterns of the pixel matrix shown in FIG. 13.
Figure 14B:
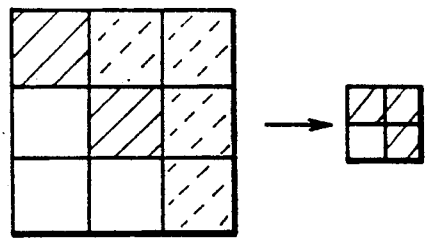
Figure 14C:
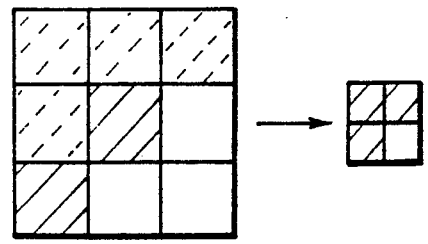
Figure 14D:
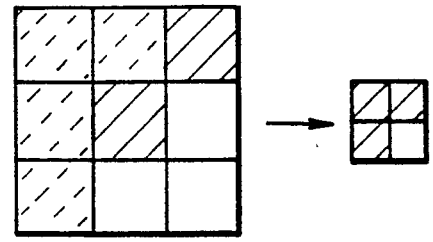
Figure 14E:
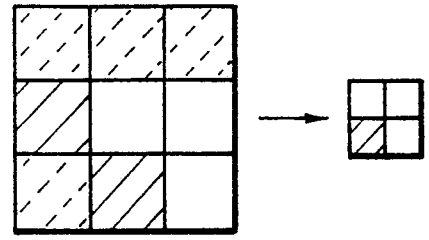
Figure 14F:
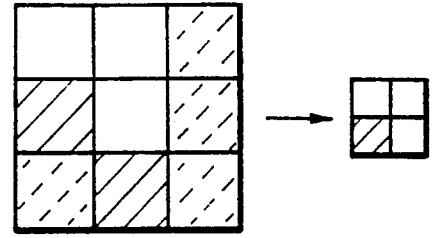
Figure 14G:
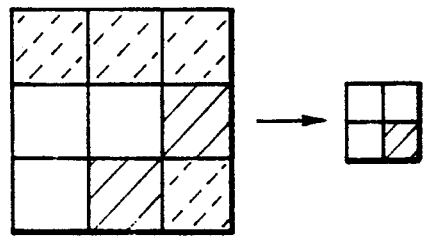
Figure 14H:
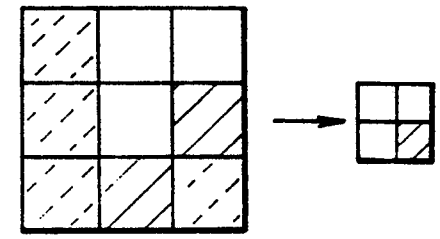

The pixel density converter 2a comprises, as shown in FIG. 11, shift registers SR1 to SR3, AND circuits AD1 to AD4, OR circuits OR1 and OR2, and exclusive "OR" circuits EX1 and EX2. The image signal DTe is input to the shift register SR1, the image signal DTd is input to the shift register SR2, and the image signal DT is input to the shift register SR3. Each shift register has three pixels of storage capacity. Therefore, the shift register SR1 stores image signals SA, SB and SC representing the adjacent pixels A, B and C, the shift register SR2 stores image signals SD, SX and SE representing the adjacent pixels D, X and E, and the shift register SR3 stores image signals SF, SG and SH representing the adjacent pixels F, G and H. The image signal SA is input to one of inverting input terminals of AND circuit AD1, one of non-inverting input terminals of AND circuit AD2, and one of inverting input terminals of AND circuit AD4. The image signals SB and SC are respectively input to another one of the inverting input terminals of AND circuit AD1, and another one of the non-inverting input terminals of AND circuit AD2. The image signal SD is input to another one of the inverting input terminals of AND circuit AD1, another one of the non-inverting input terminals of AND circuit AD2, another one of inverting input terminals of AND circuit AD3, and another one of the non-inverting input terminals of AND circuit AD4. The image signal SX is input to another one of the non-inverting input terminals of AND circuit AD1, another one of the inverting input terminals of AND circuit AD2, another one of the non-inverting input terminals of AND circuit AD3, and an input terminal of each of the exclusive "OR" circuits EX1 and EX2. The image signal SE is input to another one of the non-inverting input terminals of AND circuit AD1, another one of the inverting input terminals of AND circuit AD2, another one of the non-inverting input terminals of AND circuit AD3, and another one of the inverting input terminals of AND circuit AD4. The image signal SF is input to another one of the non-inverting input terminals of AND circuit AD1, another one of the inverting input terminals of AND circuit AD2, another one of the inverting input terminals of AND circuit AD3, and another one of the non-inverting input terminals of AND circuit AD4. The image signal SG is input to another one of the inverting input terminals of AND circuit AD3 and another one of the non-inverting input terminals of AND circuit AD4. The image signal SH is input to another one of the non-inverting input terminals of AND circuit AD3. Respective output terminals of the AND circuits AD1 and AD2 are connected to the other input terminal of the exclusive "OR" circuit EX1 via the OR circuit OR1. Respective output terminals of the AND circuits AD3 and AD4 are connected to the other input terminal of the exclusive "OR" circuit EX2 via the OR circuit OR2. The exclusive "OR" circuit EX1 outputs the image signal SX1, and the exclusive "OR" circuit EX2 outputs the image signal SX2.

A description will now be given of the case where the receiver FAX adopts the fine resolution and the transmitter FAX adopts the standard resolution. In this case, an image signal with the standard resolution is first converted into that with the high level resolution, and then converted into an image with the fine resolution. In addition, since color patterns of the pixel matrix used when the standard resolution is converted into the high level resolution are different from those used when the high level resolution is converted into the fine resolution, errors generated by the conversion never accumulate.

Figure 15A:
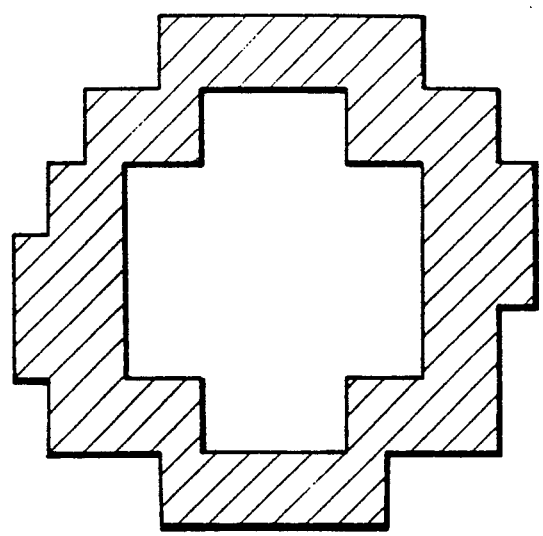
FIGS. 15A and 15C show how jagged edges of an image are smoothed based on the color patterns shown in FIGS. 12A to 12D and FIGS. 14A to 14H.
Figure 15B:
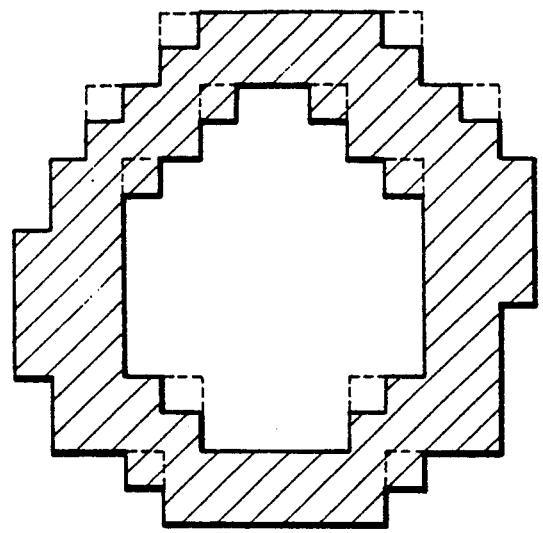
Figure 15C:
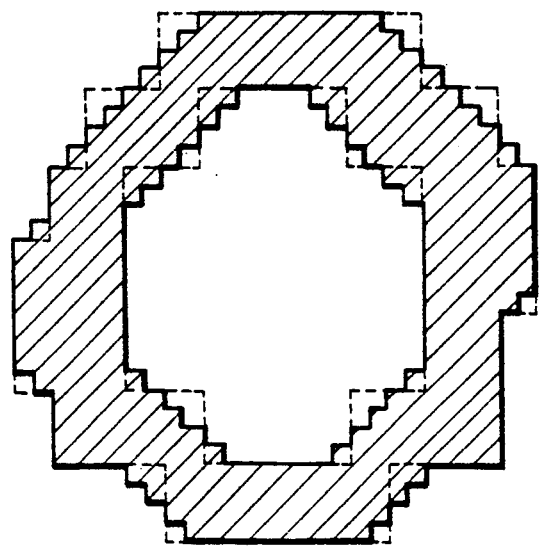
Figure 13:
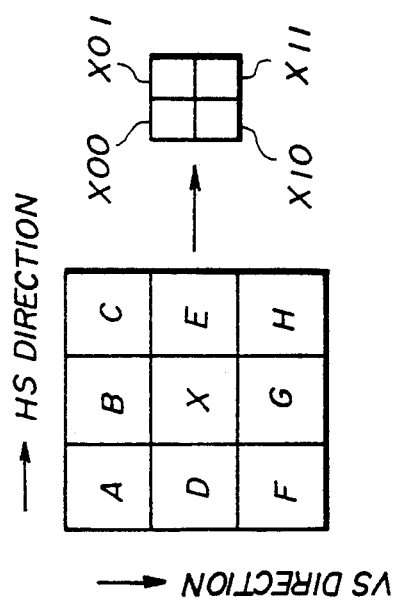
FIG. 13 shows the pixel matrix used for the third embodiment according to the present invention.

An image signal of the standard resolution is converted into an image of the high level resolution in accordance with the color patterns shown in FIGS. 12A to 12D. On the other hand, a target pixel X of the high level resolution, as shown in FIG. 13, is converted into pixels X00, X01, X10 and X11 of the fine resolution, as shown in FIGS. 14A to 14H. If a color pattern of the pixel matrix does not correspond to any of pixel matrices shown in FIGS. 14A to 14H, the pixels X00 to X11 are determined to be colored the same as the pixel X. By using this method, a circular image with the standard resolution shown in FIG. 15A is first converted into a circular image with the high level resolution shown in FIG. 15B and finally converted into a circular image with the fine resolution shown in FIG. 16C, so that the image's jagged edges are successfully smoothed.

Figure 16:
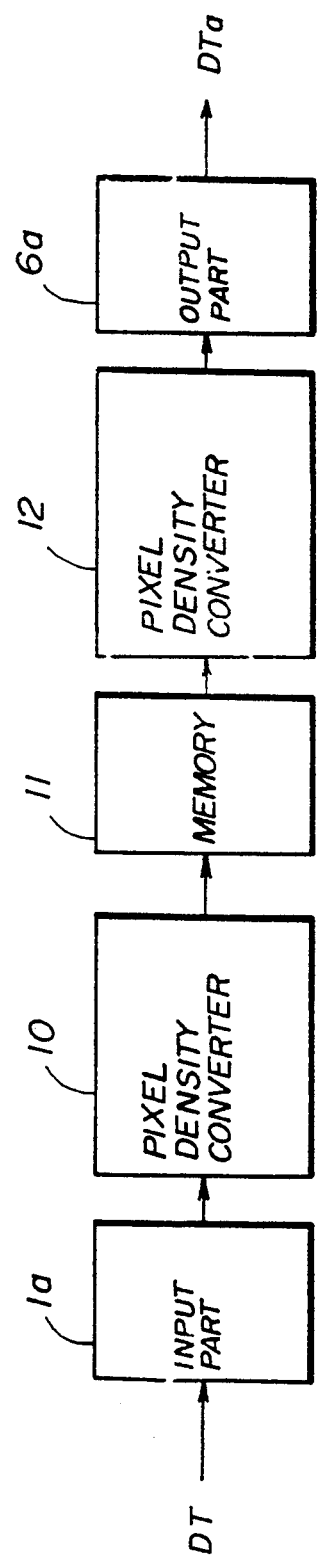
FIG. 16 shows a block diagram of an image processor of the third embodiment according to the present invention.

An image processor of the third embodiment according to the present invention which converts a target pixel X in accordance with the color pattern shown in FIGS. 15A to 15H comprises, as shown in FIG. 16, an input part 1a, pixel density converters 10 and 12, a memory 11, and an output part 6a. The image signal Dt with the standard resolution is input to the pixel density converter 10 via the input part 1a, and converted into the image signal with the high level resolution based on the color patterns shown in FIG. 12A to 12D. Then the image signal with the high level resolution is stored in the memory 11. Next, the image signal with the high level resolution is sequentially input to the pixel density converter 12. The pixel density converter 12 converts the image signal with the high level resolution into the image signal DTa with the fine resolution based on the color patterns shown in FIG. 15A to 15H. Lastly, the image signal DTa is output from the output part a to another device at a subsequent stage.

Incidentally, the present invention is not limited to the G3 FAX. In addition, the target pixel is not limited to the center pixel of the 3*3 pixel matrix.

Further, the present invention is not limited to these preferred embodiments, as various variations and modifications may be made without departing from the scope of the present invention.

What is claimed is:

1. An image processor which converts a first resolution with which a predetermined image is expressed on a first pixel matrix into a second resolution with which the predetermined image is expressed on a second pixel matrix, the first pixel matrix comprising a plurality of first pixels each of which is predetermined integer times as long as each of second pixels in a horizontal scanning direction and/or in a vertical scanning direction, which second pixels constitute the second pixel matrix, comprising:

dividing means for dividing each first pixel into the predetermined integer number of second pixels; and color set means for setting a color of an arbitrary second pixel based on a color pattern of a 3*3 pixel matrix whose first, second and third rows are respectively aligned with the horizontal direction and whose first, second and third columns are respectively aligned with the vertical direction, the first row of the 3*3 pixel matrix comprising three second pixels, and the second and third rows of the 3*3 pixel matrix comprising six first pixels, a center pixel of the 3*3 pixel matrix being a target pixel X including the arbitrary second pixel.

2. An image processor according to claim 1, wherein the first resolution is a standard resolution and the second resolution is a high level resolution, the first pixel being twice as long as the second pixel in the vertical scanning direction but being as long as the second pixel in the horizontal scanning direction, and wherein said color set means sets a color of each of two pixels X1 and X2 of the second resolution which constitute the target pixel X, the pixels of the first row from the first column to the third column of the 3*3 pixel matrix being referred to as A, B and C, the pixels of the second row from the first column to the third column thereof being referred to as D, X and E, the pixels of the third row from the first column to the third column thereof being referred to as F, G and H, and said color set means setting the pixel X1 white and the pixel X2 black if the pixels A, B, C and D are white and the pixels X, E and F are black, or if pixels A, B, C and E are white and the pixels D, X and H are black, and said color set means setting the pixel X1 black and the pixel X2 white if the pixels B, C and D are black and the pixels X, E and F are white, or if pixels A, B and E are black and the pixels D, X and H are white.

3. An image processor which converts a standard resolution with which a predetermined image is expressed on a first pixel matrix into a high level resolution with which the predetermined image is expressed on a second pixel matrix, the first pixel matrix comprising a plurality of first pixels each of which is as long as each of second pixels in a horizontal scanning direction but twice as long as the same in a vertical scanning direction, which second pixels constitute the second pixel matrix, comprising:

dividing means for dividing each first pixel into two second pixels; and color set means for setting a color of each of two second pixels X1 and X2 based on a color pattern of a 3*3 pixel matrix whose first, second and third rows are respectively aligned with the horizontal scanning direction and whose first, second and third columns are respectively aligned with the vertical scanning direction, the 3*3 pixel matrix comprising nine first pixels, a center pixel of the 3*3 pixel matrix being a target pixel X which comprises the pixels X1 and X2, the pixels of the first row from the first column to the third column of the 3*3 pixel matrix being referred to as A, B and C, the pixels of the second row from the first column to the third column thereof being referred to as D, X and E, the pixels of third row from the first column to the third column thereof being referred to as F, G and H, said color set means setting the pixel X1 white and the pixel X2 black if the pixels A, B, C and D are white and the pixels X, E and F are black, or if pixels A, X and E are white and the pixels D, G and H are black, and said color set means setting the pixel X1 black and the pixel X2 white if the pixels B, C and D are black and the pixels X, E and F are white, or if pixels A, X and E are black and the pixels D, F, G and H are white.

4. An image processor which converts a standard resolution with which a predetermined image is expressed on a first pixel matrix into a fine resolution with which the predetermined image is expressed on a second pixel matrix, the first pixel matrix comprising a plurality of first pixels each of which is twice as long as each of second pixels in a horizontal scanning direction and four times as long as each of the second pixels in a vertical scanning direction, the second pixels constituting the second pixel matrix, comprising:

first converting means for converting the standard resolution into a high level resolution with which the predetermined image is expressed on a third pixel matrix which comprises a plurality of third pixels, each of the first pixels being as long as each of the third pixels in the horizontal scanning direction but twice as long as each of the third pixels in the vertical scanning direction, which first converting means comprises;

first dividing means for dividing each first pixel into two third pixels, and first color set means for setting a color of two third pixels X1 and X2 based on a first color pattern of a first 3*3 pixel matrix whose first, second and third rows are respectively aligned with the horizontal scanning direction and whose first, second and third columns are respectively aligned with the vertical scanning direction, the first 3*3 pixel matrix comprising nine first pixels, a center pixel of the first 3*3 pixel matrix being a target pixel X which comprises the third pixels X1 and X2, and second converting means for converting the high level resolution into the fine resolution, which second converting means comprises;

first dividing means for dividing each third pixel into four second pixel, and second color set means for setting a color of four third pixels Y00, Y01, Y10 and Y11 based on a second color pattern different from the first color pattern of a second 3*3 pixel matrix whose first, second and third rows are respectively aligned with the horizontal scanning direction and whose first, second and third columns are respectively aligned with the vertical scanning direction, the second 3*3 pixel matrix comprising ninth third pixels, a center pixel of the second 3*3 pixel matrix being a target pixel Y which comprises the pixels Y00, Y01, Y10 and Y11, the pixels Y00 and Y01 and the pixels Y10 and Y11 being aligned with the horizontal scanning direction, and the pixels Y00 and Y10 and the pixels Y01 and Y11 being aligned with the vertical scanning direction.

5. An image processor according to claim 4, wherein the pixels of the first row from the first column to the third column of the first 3*3 pixel matrix are referred to as A, B and C, the pixels of the first column to the third column thereof are referred to as D, X and E, and the pixels of the third row from the first column to the third column thereof are referred to as F, G and H, the first pixels of the first row of the first 3*3 pixel matrix being referred to as A, B and C in the horizontal scanning direction, the first color set means setting the pixel X1 white and the pixel X2 black if the pixels A, B, C and D are white and the pixels X, E and F are black, or if pixels A, B, C and E are white and the pixels D, X and H are black, and said color set means setting the pixel X1 black and the pixel X2 white if the pixels B, C and D are black and the pixels X, E and F are white, or if pixels A, B and E are black and the pixels D, X and H are white, and wherein the pixels of the first row from the first column to the third column of the second 3*3 pixel matrix are referred to as A1, B1 and C1, the pixels of the second row from the first column to the third column thereof are referred to as D1, Y and E1, and the pixels of the third row from the first column to the third column thereof are referred to as F1, G1 and H1, the second color set means setting each of the pixels Y00, Y01 and Y11 black and the pixel Y10 white if the pixels D1, F1 and G1 are white and the pixels Y and H1 are black, or if pixels A1 and Y are black and the pixels D1, F1 and G1 are white, the second color set means setting each of the pixels Y00, Y01 and Y10 black and Y11 white if pixels Y and F1 are black and pixels E1, G1 and H1 are white, or if the pixels C1 and Y are black and pixels E1, G1 and H1 are white, the second color set means setting each of the pixels Y00, Y01 and Y11 white and the pixel Y10 black if the pixels D1 and G1 are black and the pixels Y, E1 and H1 are white, or if pixels A1, B1 and Y are white and the pixels D1 and G1 are black, and the second color set means setting each of the pixels Y00, Y01 and Y10 white and the pixel Y11 black if the pixels D1, Y and F1 are white and the pixels E1 and G1 are black, or if pixels B1, C1 and Y are white and the pixels E1 and G1 are black.

* * * * *